United States Patent
Yamashiro

(10) Patent No.: US 9,383,215 B2
(45) Date of Patent: Jul. 5, 2016

(54) ROUTE GUIDANCE SYSTEM, ROUTE GUIDANCE APPARATUS, AND TRAVEL ROUTE TRANSMISSION APPARATUS

(71) Applicant: DENSO CORPORATION, Kariya, Aichi-pref. (JP)

(72) Inventor: Takahisa Yamashiro, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 178 days.

(21) Appl. No.: 14/064,284

(22) Filed: Oct. 28, 2013

(65) Prior Publication Data

US 2014/0129137 A1    May 8, 2014

(30) Foreign Application Priority Data

Nov. 5, 2012 (JP) ................ 2012-243625

(51) Int. Cl.
*G08G 1/087* (2006.01)
*G01C 21/34* (2006.01)

(52) U.S. Cl.
CPC .................. *G01C 21/3407* (2013.01)

(58) Field of Classification Search
None
See application file for complete search history.

(56) References Cited

U.S. PATENT DOCUMENTS

| | | | | |
|---|---|---|---|---|
| 6,405,132 | B1 * | 6/2002 | Breed et al. | 701/301 |
| 6,889,137 | B1 * | 5/2005 | Rychlak | 701/410 |
| 6,895,332 | B2 * | 5/2005 | King et al. | 701/457 |
| 6,980,130 | B2 * | 12/2005 | Kusayanagi et al. | 340/988 |
| 7,395,151 | B2 * | 7/2008 | O'Neill et al. | 701/411 |
| 8,965,677 | B2 * | 2/2015 | Breed et al. | 701/301 |
| 2001/0029425 | A1 * | 10/2001 | Myr | 701/200 |
| 2002/0177945 | A1 * | 11/2002 | Davies | 701/209 |
| 2005/0221876 | A1 * | 10/2005 | Van Bosch et al. | 455/575.9 |
| 2006/0085124 | A1 * | 4/2006 | Suzuki | 701/211 |
| 2007/0129055 | A1 * | 6/2007 | Ehlers | 455/404.2 |
| 2008/0140287 | A1 * | 6/2008 | Yang et al. | 701/45 |
| 2010/0153002 | A1 * | 6/2010 | Lee et al. | 701/201 |
| 2011/0015860 | A1 * | 1/2011 | Nesbitt | 701/209 |
| 2013/0106594 | A1 * | 5/2013 | Hiramatsu et al. | 340/436 |
| 2013/0218453 | A1 * | 8/2013 | Geelen | 701/410 |
| 2014/0278052 | A1 * | 9/2014 | Slavin et al. | 701/400 |

FOREIGN PATENT DOCUMENTS

JP    2001-319297    11/2001

* cited by examiner

*Primary Examiner* — John R Olszewski
*Assistant Examiner* — Navid Ziaeianmehdizadeh
(74) *Attorney, Agent, or Firm* — Harness, Dickey & Pierce, P.L.C.

(57) ABSTRACT

A route guidance system to guide an emergency vehicle to an emergency site includes a first navigation apparatus mounted in a first emergency vehicle and a second navigation apparatus mounted in a second emergency vehicle. The first navigation apparatus performs an approach route record process which records an approach route of the first emergency vehicle from a predetermined reference position to an emergency site, and an approach route transmission process which transmits the recorded approach route upon detecting a predetermined manipulation by an occupant when the first emergency vehicle reaches the emergency site. The second navigation apparatus receives the approach route transmitted from the first navigation apparatus and performs an approach route guidance process to guide the second emergency vehicle to the emergency site based on the received approach route.

19 Claims, 12 Drawing Sheets

ROUTE GUIDANCE SYSTEM, ROUTE GUIDANCE APPARATUS, AND TRAVEL ROUTE TRANSMISSION APPARATUS

CROSS REFERENCE TO RELATED APPLICATION

The present application is based on Japanese Patent Application No. 2012-243625 filed on Nov. 5, 2012, the disclosure of which is incorporated herein by reference.

TECHNICAL FIELD

The present disclosure relates to a route guidance system, a route guidance apparatus in the system, and a travel route transmission apparatus in the system.

BACKGROUND ART

Patent Literature 1: JP 2001-319297 A

A conventional technology is known which guides an emergency vehicle to an emergency site that is an occurrence position of an emergency situation. For instance, Patent Literature 1 discloses a technology as follows. A center apparatus retrieves some route information to guide a fire truck to a fire site from a variety of information collected and transmits the retrieved route information wirelessly. Meanwhile, the fire truck, which receives the route information from the center apparatus, displays the received route information in a display apparatus.

The technology disclosed in Patent Literature 1 thus transmits the route information retrieved from a variety of information collected in the center apparatus. For instance, the information may be collected after confirming an occurrence of an emergency situation. This needs a time period from when confirming the occurrence of the emergency situation to when transmitting the route information. This may not permit a quick dispatch of a fire truck to an emergency site in spite of emergency.

In contrast, the information may be collected in advance before an occurrence of an emergency situation. This may, however, deteriorate a freshness of the collected information, so that the route information which does not meet a recent state around an emergency site may be retrieved and transmitted by the center apparatus. For instance, a road segment included in the route information may be incidentally in an impassable state owning to a parked vehicle or an object over the road segment. Such a case may eventually transmit the route information including the impassable road segment. The occupant of an emergency vehicle running along the route information transmitted from the center apparatus may necessarily stop and return at the impassable road segment, therefore needing to go to the emergency site while independently searching for a route to reach the emergency site.

SUMMARY

It is an object of the present disclosure to provide a route guidance system, a route guidance apparatus in the system, and a travel route transmission apparatus in the system, which can guide an occupant of an emergency vehicle along a route to reach an occurrence site of an emergency situation, permitting a prompt arrival to the occurrence site.

To achieve the above object, according to an example of the present disclosure, a route guidance system is provided to include a travel route transmission apparatus and a route guidance apparatus. The travel route transmission apparatus is used in at least one subject vehicle and includes (i) an approach route record section that records an approach route of the subject vehicle from where a predetermined reference position to where an emergency site which is an occurrence position of an emergency situation, and (ii) an approach route transmission section that starts a transmission of the approach route recorded in the approach route record section upon detecting a predetermined manipulation by an occupant of the subject vehicle when the subject vehicle arrives at the emergency site. The route guidance apparatus is used in an emergency vehicle and includes (i) an approach route reception section that receives the approach route transmitted from the travel route transmission apparatus of the subject vehicle, and (ii) a guidance section that performs a route guidance to the emergency site based on the approach route received by the approach route reception section.

Under this configuration, the travel route transmission apparatus of the vehicle having reached an emergency site earlier is configured to transmit an approach route actually traveled to the emergency site. The route guidance apparatus of the emergency vehicle is thus permitted to perform a route guidance based on the actually traveled approach route. The approach route actually traveled by the vehicle having previously reached the emergency site is a route which actually enabled an arrival at the emergency site. Thus the above configuration enables an occupant of an emergency vehicle to receive a guidance of a route that can actually reach an emergency site.

Since the approach route of a vehicle which arrived at an emergency site previously can be used as a route which can actually reach the emergency site, the time period for acquisition of the approach route and guidance to the emergency site is shorter than that in the case of retrieving the approach route by collecting a variety of information from a plurality of vehicles or a center. In addition, the transmission of the approach route is started by the travel route transmission apparatus upon detecting a predetermined manipulation by an occupant of the vehicle when the vehicle arrives at the emergency site. This may enable the transmission of the approach route from the travel route transmission apparatus for a significantly short time period after the vehicle arrives at the emergency site with a high possibility. The above configuration thus permits a prompt guidance to reach an occurrence site of an emergency situation.

Furthermore, as explained above, the transmission of the approach route from the travel route transmission apparatus may be completed for a significantly short time period after the vehicle arrives at the emergency site with a high possibility. Thus the transmitted approach route may be an approach route that is matching a recent state and thus passable. Thus the above configuration more certainly enables an occupant of an emergency vehicle to receive a guidance of a route that can actually reach an emergency site.

As a result, the above configuration permits an occupant of an emergency vehicle to promptly receive a suitable guidance of a route and to certainly reach an occurrence site of an emergency situation.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Embodiments of the present disclosure are explained with reference to drawings.

First Embodiment

Figure 1:
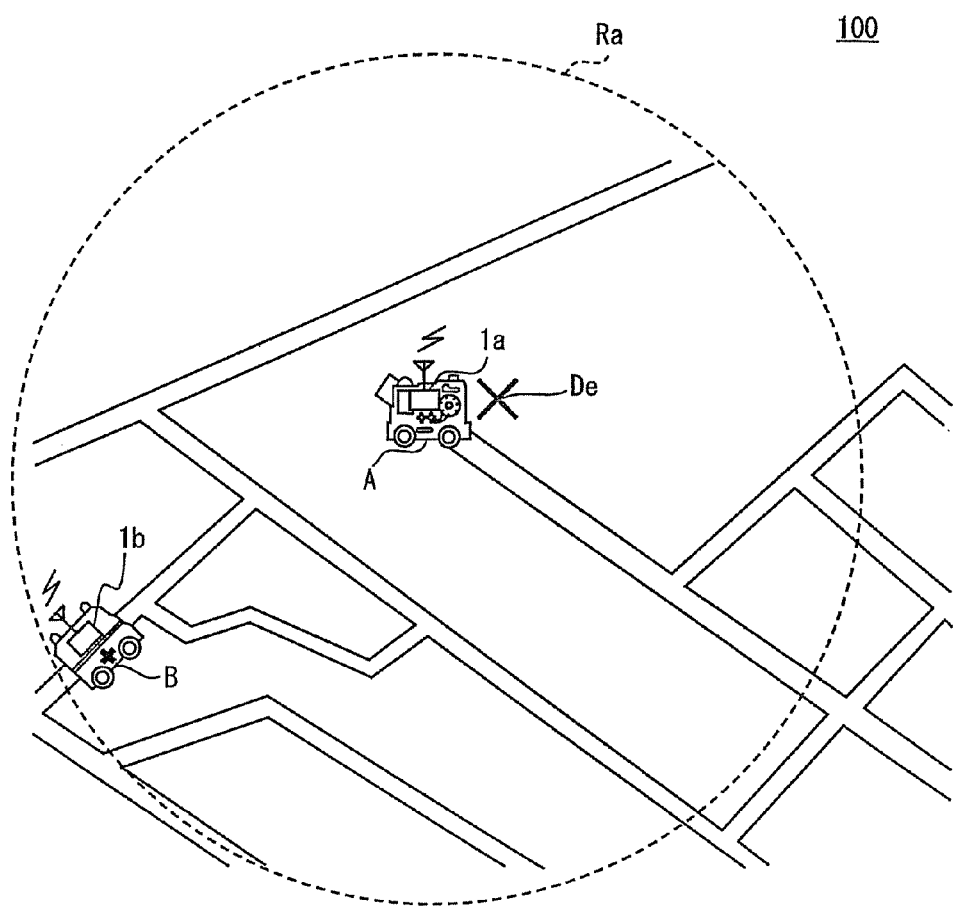
FIG. 1 is a diagram illustrating an overall configuration of a navigation system according to a first embodiment of the present disclosure.

The following explains a navigation system 100 serving as a route guidance system according to a first embodiment of the present disclosure. The navigation system 100 includes a plurality of navigation apparatuses 1, which are mounted to or used by a plurality of respective vehicles (which may be referred to as host vehicles). With reference to FIG. 1, for instance, the navigation system 100 includes a first navigation apparatus 1a mounted to a first emergency vehicle A and a second navigation apparatus 1b mounted to a second emergency vehicle B. Further, a host vehicle may be used as a vehicle that mounts with or uses a subject apparatus, collectively. That is, the host vehicle of a subject apparatus signifies a vehicle that is mounted with the subject apparatus or that uses the subject apparatus, inside of the host vehicle itself.

FIG. 1 illustrates an occurrence position De (also referred to as an emergency site De) of an emergency situation. The first emergency vehicle A mounted with the first navigation apparatus 1a has already arrived at the emergency site De, whereas the second emergency vehicle B mounted with the second navigation apparatus 1b has not yet arrived at the emergency site De. In addition, a circle Ra encircled with the broken line indicates a communication range of a vehicle-to-vehicle communication of the first navigation apparatus is of the first emergency vehicle A.

The above emergency vehicle is a vehicle or automobile that is used in a service or work that needs urgency for a certain reason such as a lifesaving or a fire-fighting operation (collectively referred to as emergency). For example, the emergency vehicles include a vehicle for fire fighting (i.e., fire truck), a vehicle for first-aid (i.e., ambulance vehicle), and/or a police vehicle. In addition, the emergency sites include a fire site, a building collapse site in earthquake disaster.

Figure 2:
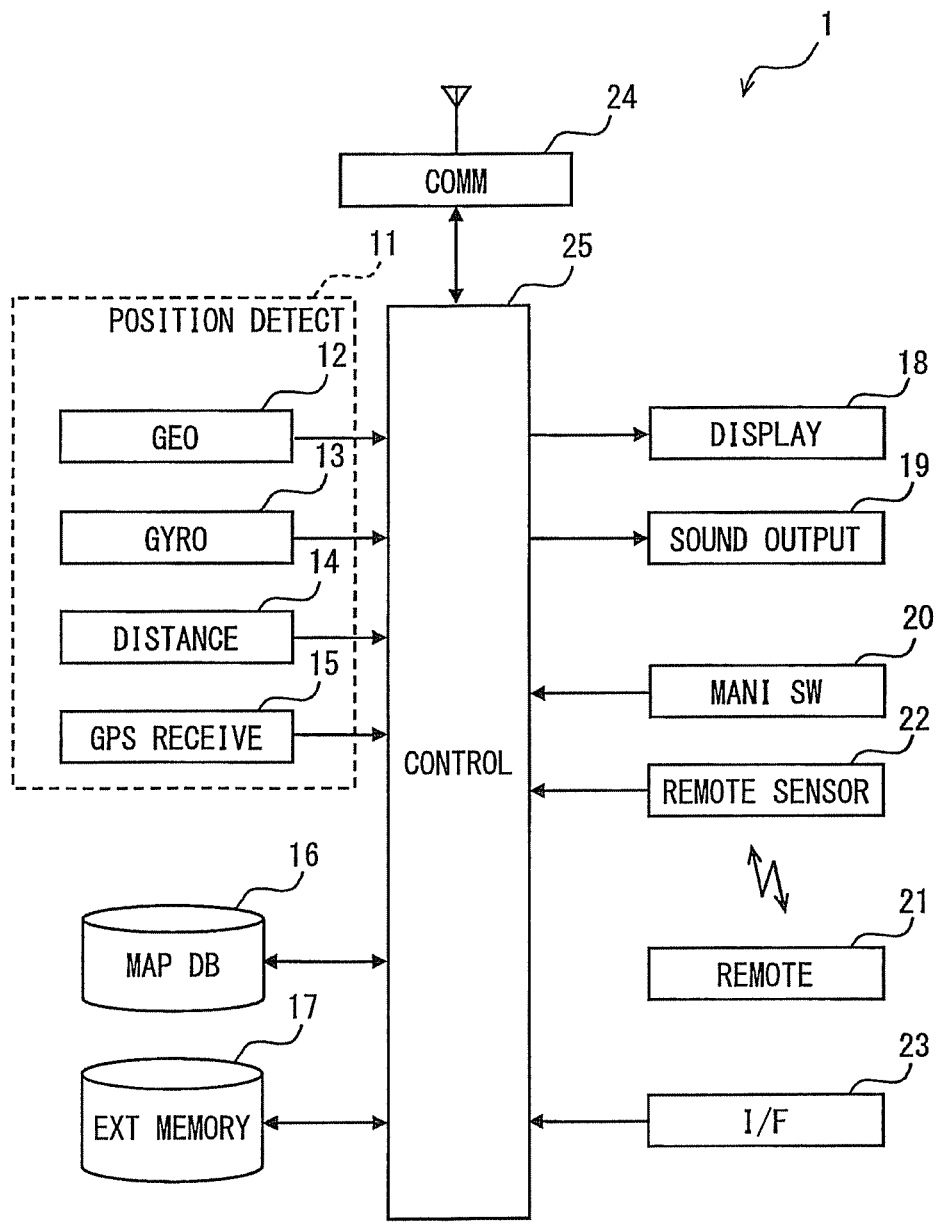
FIG. 2 is a block diagram illustrating a configuration of a navigation apparatus according to the first embodiment.

With reference to FIG. 2, the navigation apparatus 1 includes the following: a position detection unit 11; a map database (DB) storage 16; an external memory 17; a display portion 18; a sound output portion 19; a manipulation switch group 20; a remote control terminal 21 (i.e., a remote control 21); a remote control sensor 22; an external input interface (I/F) 23; a communicator 24; and a control circuit 25.

The position detection unit 11 includes following known sensors or the like: a geomagnetic sensor 12, a gyroscope 13, a speed or distance sensor 14 that calculates a travel distance, and a GPS receiver 15 for GPS (Global Positioning System) which detects a present position based on electric waves from satellites; the unit 11 thus continuously detects a present position of the unit 11 itself. For example, the present position is exemplified to be the coordinates of a latitude and a longitude.

The individual sensors have different types of detection errors from each other; therefore, they are used to complement each other. In addition, the position detection unit 11 may be constructed of a part of the above sensors depending on the accuracy of each sensor. The position detection unit 11 naturally detects a vehicle position that is a present position of a host vehicle mounting with or using the navigation apparatus 1. The following explanation will be made under the assumption that the position detection unit 11 detects a vehicle position (i.e., a present position) of a host vehicle continuously.

The map DB storage 16 stores a map database or map data. The map data include road data having node data and link data for indicating roads. The link data relative to each link include a unique number (link ID) for specifying the link, a link length for indicating the length of the link, start and end node coordinates (latitudes and longitudes), a road name, a road class, a regulation attribute such as one-way traffic or right/left turn prohibition, a road width, the number of lanes, presence/absence of dedicated lanes for right/left turn and the number thereof, and a speed limit regulation. The node data relative to each node include a unique number (node ID) for specifying the node, node coordinates, a node name, connection link IDs for indicating links connected to the node, and an intersection class.

The map data of the map DB storage 16 may be downloaded by the control circuit 25 from a network such as the Internet via a communication I/F (unshown), or may be previously stored. The map DB storage 16 is exemplified to be a storage media such as CD-ROM, DVD-ROM, memory card, or HDD.

The external memory 17 is a rewritable memory with a large data volume such as a hard disk drive (HDD). The external memory 17 stores data, which need to be inerasable even if power supply is turned off. The external memory 17 is also used for copying frequently some data to be used from the map DB storage 16. In addition, the external memory 17 may be a removable memory with comparatively small data capacity.

The display portion 18 enables a color display and includes a liquid crystal display, an organic electroluminescence display, a plasma display, or the like. The sound output portion 19 includes a speaker and outputs guidance sounds in the route guidance based on instructions by the control circuit 25.

For example, the manipulation switch group 20 includes mechanical switches or touch-sensitive switches which are integrated with the display portion 18. According to a switching manipulation, an operation instruction for each of various functions is issued to the control circuit 25.

The remote control 21 has multiple manipulation switches (not shown) for inputting various command signals into the control circuit 25 via the remote control sensor 22 by switching manipulation to execute the same function as the manipulation switch group 20 to the control circuit 25.

The external input I/F 23 is an interface for the control circuit 25 to acquire some information on vehicle states from an electronic control unit (i.e., ECU) or a sensor which is mounted in the host vehicle. For example, the external input I/F 23 receives the information on vehicle states from the in-vehicle ECU or in-vehicle sensor via an in-vehicle local area network (i.e., LAN) complying with a communication protocol such as CAN (Controller Area Network).

The information on vehicle states is exemplified to be a signal of a shift position sensor, a signal of an ON/OFF signal of a parking brake switch, and/or an ON/OFF signal of a door courtesy switch. In addition, an emergency vehicle may include a sensor or switch to detect an actuation of a rescue apparatus, such as a water cannon apparatus. In such a case, a signal of the sensor or switch detecting an actuation of the rescue apparatus may be included in the information on vehicle states.

The communicator 24 includes a transceiver antenna to perform a wireless vehicle-to-vehicle communication with a communicator 24 of a different vehicle existing in a periphery of the host vehicle without using a telephone network, thereby achieving the transmission or distribution of the information on host vehicle, and the reception of the information on the different vehicle. For example, the vehicle-to-vehicle communication using the radio waves of 700 MHz band permits the communication with a different vehicle existing within a circular range with a radius of about 1 km centering on the host vehicle. Meanwhile, the vehicle-to-vehicle communication using the radio waves of 5.9 GHz band permits the communication with a different vehicle existing within a circular range with a radius of about 0.5 Km centering on the host vehicle.

The control circuit 25 includes mainly a well-known microcomputer which contains a CPU, a ROM, a RAM, a backup RAM. The control circuit 25 executes various processing based on a variety of information inputted from the position detection unit 11, map DB storage 16, external memory 17, manipulation switch group 20, remote control sensor 22, external input I/F 23, and/or communicator 24. For example, the control circuit 25 (also referred to as the control circuit 25a) of the emergency vehicle A having already arrived at an emergency site executes an approach route transmission process, which will be mentioned later. Furthermore, for example, the control circuit 25 (also referred to as the control circuit 25b) of the emergency vehicle B having not yet arrived at an emergency site executes an approach route guidance process, which will be mentioned later.

Figure 3:
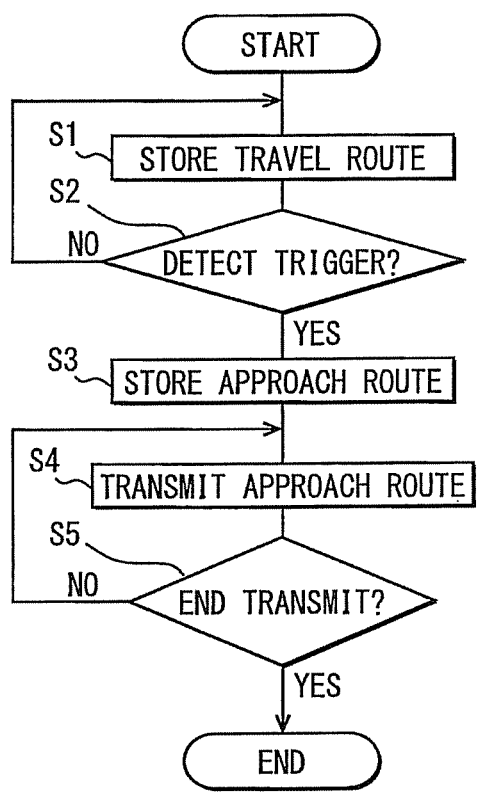
FIG. 3 is a flowchart diagram illustrating an approach route transmission process by a control circuit of a transmission-side navigation apparatus according to the first embodiment.

FIG. 3 explains a flowchart of an approach route transmission process by the control circuit 25a, which serves as a travel route transmission apparatus. For instance, the present process or flowchart may be started with a manipulation to an exclusive use switch of the manipulation switch groups 20 in the navigation apparatus is of the emergency vehicle A. The exclusive use switch is provided to indicate a mobilization of the emergency vehicle A towards an emergency site.

It is further noted that a flowchart in the present application includes sections (also referred to as steps), which are represented, for instance, as S1. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

First, at S1, the control circuit 25a continuously specifies a travel route from the vehicle positions of the emergency vehicle A detected continuously by the position detection unit 11 and the map data in the map DB storage 16, thereby storing the specified travel route in an electrically rewritable memory such as RAM. The travel route may be represented by using the above-mentioned link data and node data.

At S2, it is determined whether a predetermined trigger signal is detected. The predetermined trigger signal is exemplified to be a predetermined manipulation by an occupant of the emergency vehicle A upon arriving at an emergency site.

The predetermined manipulation serving as a trigger signal may be a switching manipulation to an exclusive use switch included in the manipulation switch group 20 of the navigation apparatus 1a. The exclusive use switch is provided to be manipulated by the occupant when the emergency vehicle A arrives at an emergency site. This configuration enables a transmission of an approach route destined for an optimal activity position in the emergency site after the occupant determines that the emergency vehicle A has arrived at that optimal activity position.

In addition, the predetermined trigger signal may be generated based on the parking of the emergency vehicle A. Under this configuration, the parking of the emergency vehicle A at the emergency site triggers an automatic transmission of the approach route that ends at the parking position; this reduces a work load of the occupant for transmitting the approach route. The parking may be detected based on the input of a signal of a shift position sensor indicating that the shift position corresponds to a parking position, an ON signal of a parking brake switch, or an OFF signal of a door courtesy switch.

Yet furthermore, the predetermined trigger signal may be generated based on an actuation of a rescue apparatus of the emergency vehicle A. Under this configuration, the actuation of the rescue apparatus of the emergency vehicle A after arriving at the emergency site triggers an automatic transmission of the approach route ending at the parking position where to actuate the rescue apparatus; this reduces a work load of the occupant for transmitting the approach route. The actuation of the rescue apparatus may be detected based on the input of a signal of a sensor or switch detecting the actuation of the rescue apparatus.

When it is determined that the trigger signal is detected (S2: YES), the processing proceeds to S3. In contrast, when it is not determined that the trigger signal is detected (S2: NO), the processing returns to S1 for repetition.

At S3, an approach route record process is executed. The processing then proceeds to S4. The approach route record process is to record an approach route of the emergency vehicle A to reach the emergency site serving a as an arrival position from a predetermined reference position in an electrically rewritable memory such as RAM based on a travel route of the emergency vehicle A stored in the memory. The processing at S3 may function as an approach route record section or means.

The arrival position of the emergency site is defined as a vehicle position that is detected by the position detection unit 11 at the time when the above-mentioned predetermined trigger signal is detected. In addition, the predetermined reference position may be defined as the node preceding from the arrival position of the emergency site by a predetermined distance or longer. In such a case, the distance traced back from the arriving position may be calculated from the link lengths of the respective links of the travel route stored in the memory. Furthermore, the predetermined reference position may be defined as the node that is the predetermined n-th node traced back from the arrival position of the emergency site.

Furthermore, the predetermined reference position may be defined as another node that is differently defined from the stored travel route. For instance, the predetermined reference position may be defined as whichever is closest to the arrival position in the emergency site, the node at which the number of lanes changes from two lanes in one traffic direction to one lane in one traffic direction, or the node at which the road width decreases by a predetermined value or more. This definition can designate as the predetermined reference position a position where to enter from a road such as a main road that is comparatively easy to locate to a road such as a narrow street that is comparatively difficult to locate. Thus only a part of the travel route may be transmitted as an approach route to reach an emergency site; the part of the travel route may be only a narrow street that is apt to need a route guidance to reach the emergency site.

At S4, an approach route transmission process is executed. The processing then proceeds to S5. The approach route transmission process is to transmit the approach route stored in the approach route record process along with a transmission ID, which is identification information specifying a transmission source or side, from the communicator 24 via the vehicle-to-vehicle communication. The processing at S4 may be function as an approach route transmission section or means. The approach route transmission process is provided to transmit the approach route with predetermined transmission time intervals, which may be 100 msec, for example.

In addition, it is desirable that the approach route transmission process transmits a size of the host vehicle or an emergency site identification information as well as the approach route. The size of the host vehicle may be referred to as a vehicle size; the emergency site identification information specifies or identifies the emergency site where the host vehicle needs to go. The vehicle size may be a vehicle lateral length (left-to-right length or width); alternatively, the vehicle size may be a vehicle longitudinal (front-to-back) length, if the vehicle longitudinal length permits an estimate of the vehicle lateral length. The vehicle size is supposed to be stored in a nonvolatile memory in the control circuit 25a. Therefore, the control circuit 25a may function as a transmission-side size storage section or means.

The emergency site identification information may be an address or ID (identification) of an emergency site, for instance. The emergency site identification information may be information, which is inputted from the manipulation switch group 20 and acquired by the control circuit 25a. Alternatively, the emergency site identification information may be information, which is transmitted from the center apparatus of the emergency vehicle and acquired by the control circuit 25a via the communicator 24. The emergency site identification information may function as site identification information. The control circuit 25a may function as a transmission-side site acquisition section or means.

At S5, it is determined whether a time point ending the transmission of the approach route comes or not. For example, the time point ending the transmission of the approach route may be determined when an exclusive use switch is manipulated which is included in the manipulation switch group 20 of the navigation apparatus 1a and used for ending the transmission of the approach route. Furthermore, the time point ending the transmission of the approach route may be determined when the change of the shift position from the parking position to the backing or heading position, or when a predetermined time period elapses since the start of the transmission of the approach route.

When it is determined that the time point ending the transmission comes (S5: YES), the present process ends. In contrast, when it is not determined that the time point ending the transmission comes (S5: NO), the processing returns to S4 for repetition.

Figure 4:
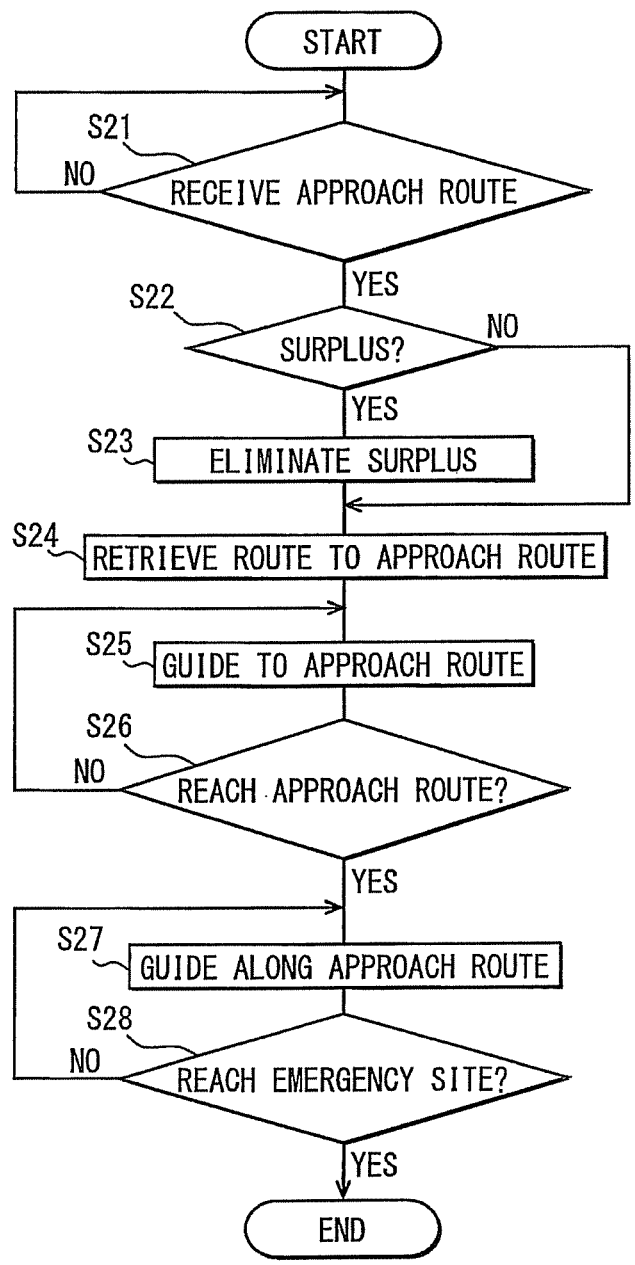
FIG. 4 is a flowchart diagram illustrating an approach route guidance by a control circuit of a reception-side navigation apparatus according to the first embodiment.

The following explains an approach route guidance process by the control circuit 25b with reference to FIG. 4. The control circuit 25b may function as a route guidance apparatus. FIG. 4 is a flowchart diagram illustrating an approach route guidance process by the control circuit 25b. For instance, the present process or flowchart may be started with a manipulation to an exclusive use switch of the manipulation switch group 20 in the navigation apparatus 1b of the emergency vehicle B. The exclusive use switch is provided to indicate a mobilization of the emergency vehicle B destined for an emergency site.

First, at S21, the control circuit 25b determines whether the above-mentioned approach route transmitted from the emergency vehicle A is received. When receiving it (S21: YES), the processing proceeds to S22. In contrast, when not receiving it (S21: NO), the processing returns to S21 for repetition. The control circuit 25b receives the approach route via the communicator 24. Therefore, the control circuit 25a may function as an approach route reception section or means.

Figure 5A:
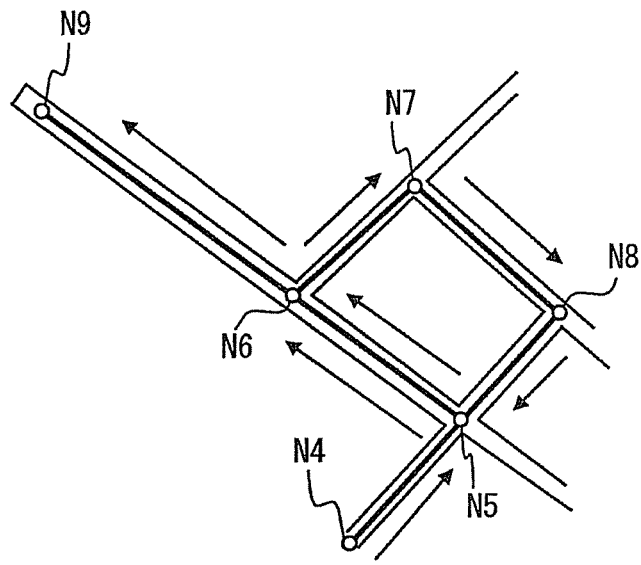
FIGS. 5A and 5B are diagrams for explaining a surplus portion of an approach route.

Next, when the received approach route includes a surplus portion that causes the approach route to pass through an identical position again (S22: YES), the processing proceeds to S23. In contrast, when the received approach route includes no surplus portion (S22: NO), the processing proceeds to S24. The surplus portion is explained with reference to FIGS. 5A and 5B. FIG. 5A illustrates an example where an approach route is represented by using nodes N4 to N9 as a sequence of N4-N5-N6-N7-N8-N5-N6-N9. This approach route passes through N5 and N6 twice. A surplus portion is defined as a road segment of N5-N6-N7-N8-N5 forming a loop passing through the nodes (N5, N6) which the host vehicle repeatedly passes through.

Figure 5B:
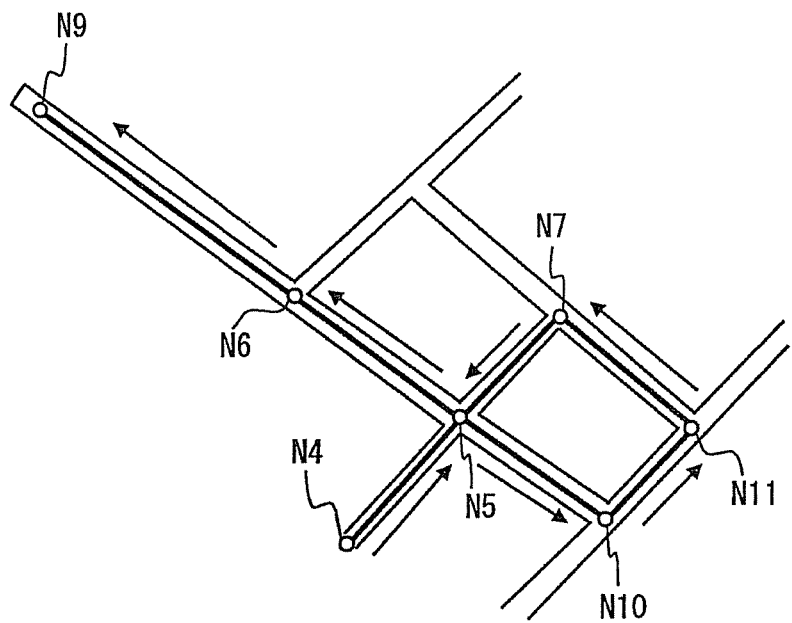

FIG. 5B illustrates an example where an approach route is represented by using nodes N4 to N7, and N9 to N11 as a sequence of N4-N5-N10-N11-N7-N5-N6-N9. This approach route passes through N5 twice. A surplus portion is defined as a road segment of N5-N10-N11-N7-N5 forming a loop passing through the node (N5) which the host vehicle repeatedly passes through.

At S23, a surplus elimination process is performed. The processing then proceeds to S24. The processing at S23 of the control circuit 25b may function as a reception-side surplus elimination section or means. The surplus elimination process eliminates the above-mentioned surplus portion from the approach route including the same.

Figure 6A:
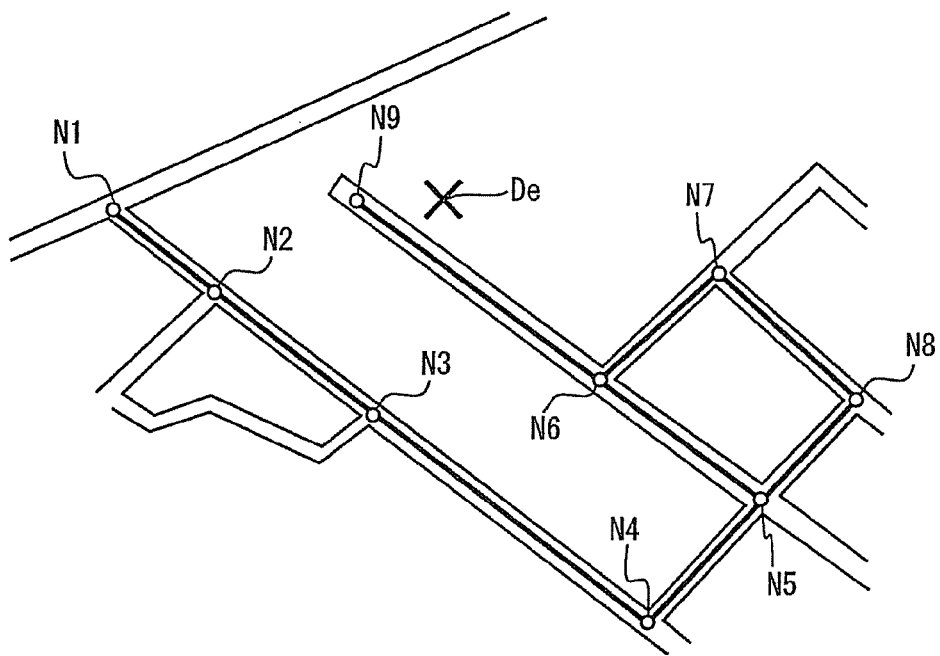
FIGS. 6A and 6B are diagrams for explaining a surplus portion elimination process.
Figure 6B:
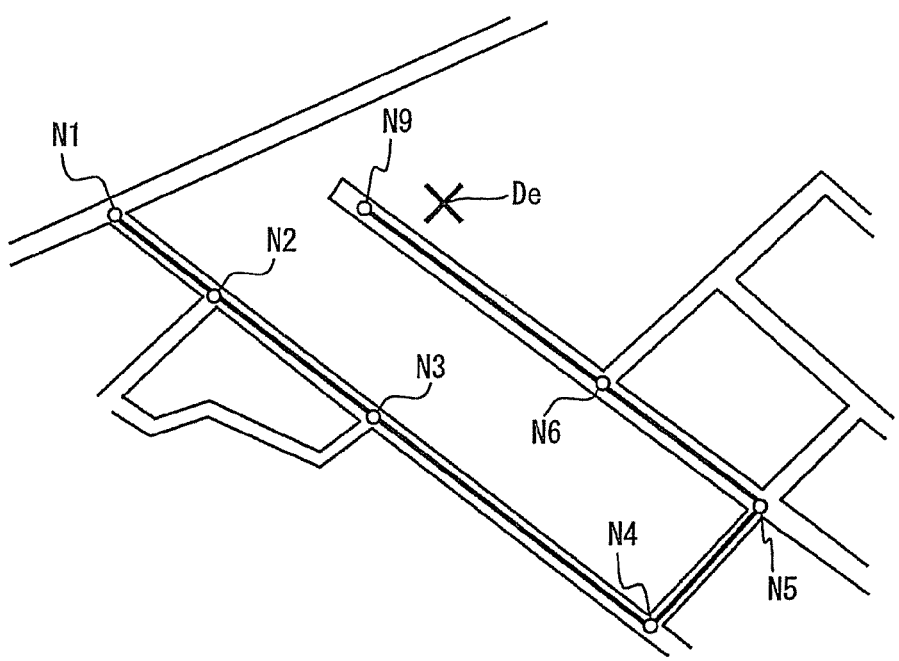

An example of the surplus elimination process is explained with reference to FIGS. 6A and 6B. FIG. 6A illustrates an example where an approach route is represented by using nodes N1 to N9 as a sequence of N1-N2-N3-N4-N5-N6-N7-N8-N5-N6-N9 and thus includes as a surplus portion the road segment of N5-N6-N7-N8-N5. In this case, the surplus elimination process eliminates the road segment of N5-N6-N7-N8 to prepare an approach route (i.e., a surplus-eliminated approach route) of N1-N2-N3-N4-N5-N6-N9 as indicated in FIG. 6B.

At S24, a recommended route is retrieved which travels from the present position of the emergency vehicle B to the approach route. The processing at S24 may function as a retrieval section or means. The approach route used for the retrieval of the recommended route is the approach route after the surplus portion is eliminated when the surplus elimination process is performed, or the approach route that is received via the vehicle-to-vehicle communication when the surplus elimination process is not performed.

The present position of the emergency vehicle B may be a vehicle position that the control circuit 25b detects before executing S24. The control circuit 25b may function as a position acquisition section or means.

In addition, the recommended route from the present position of the emergency vehicle B to the approach route is retrieved as follows. First, a destination is defined as a node that has a shortest straight distance from the present position of the emergency vehicle B among the nodes included in the approach route. Then a known retrieval method may be used to retrieve a route from the present position of the emergency vehicle B to the node defined as the destination while disregarding the traffic regulation attributes such as one-way traffic regulation or right/left turn prohibition.

Furthermore, the recommended route may be differently retrieved as follows. First, at least two destinations are defined as the nodes that have shorter straight distances from the present position of the emergency vehicle B among the nodes included in the approach route. Then the recommended routes are retrieved with respect to the respective destinations. In this case, the final recommended route may be selected which has the smallest travel distance or the smallest travel time. This enables the emergency vehicle B to reach the emergency site for a shorter time period.

At S25, a route guidance of the recommended route retrieved at S24 is performed to reach the approach route. The processing at S25 may function as a guidance section or means. The route guidance of the recommended route to reach the approach route may be performed like in a well-known route guidance. That is, the recommended route and the present position of the host vehicle are superimposed on an electronic map displayed in the display portion 18; furthermore, the audio guidance of the right/left turn is outputted from the sound output portion 19.

At S26, it is determined whether the emergency vehicle B reaches the approach route. For instance, when the present position of the emergency vehicle B comes to be located on the approach route, it may be determined that the emergency vehicle B reaches the approach route. When it is determined that the emergency vehicle B reaches the approach route (S26:YES), the processing proceeds to S27. In contrast, when it is not determined that the emergency vehicle B reaches the approach route (S26: NO), the processing returns to S25 for repetition.

At S27, an approach route guidance process is executed. The processing then proceeds to S28. The approach route guidance process performs a route guidance along the approach route. The processing at S27 may function as a retrieval section or means. The approach route used for the route guidance is the approach route after the surplus portion is eliminated when the surplus elimination process is performed, or the approach route, which has not undergone the surplus elimination process and is thus the same as one received via the vehicle-to-vehicle communication when the surplus elimination process is not performed.

The route guidance may be made by superimposing the approach route and the present position of the host vehicle on an electronic map displayed in the display portion 18. In this case, the route guidance may be made by performing a display in a display portion 18 to distinguish between (i) the approach route with the surplus portion eliminated and (ii) the approach route with the surplus portion is not yet eliminated.

Figure 7A:
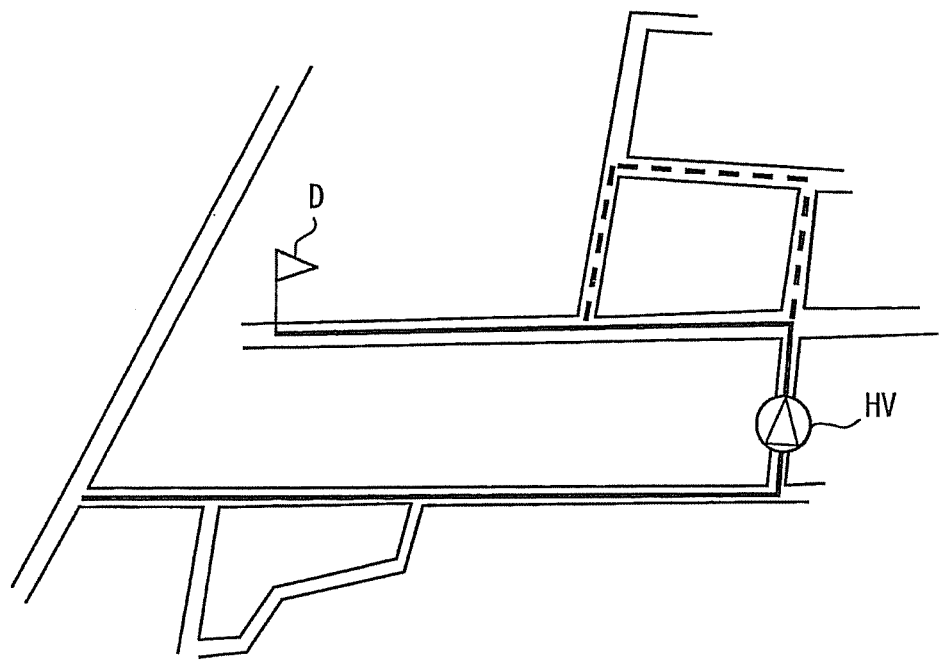
FIGS. 7A and 7B are diagrams of example displays of an approach route in a route guidance.
Figure 7B:
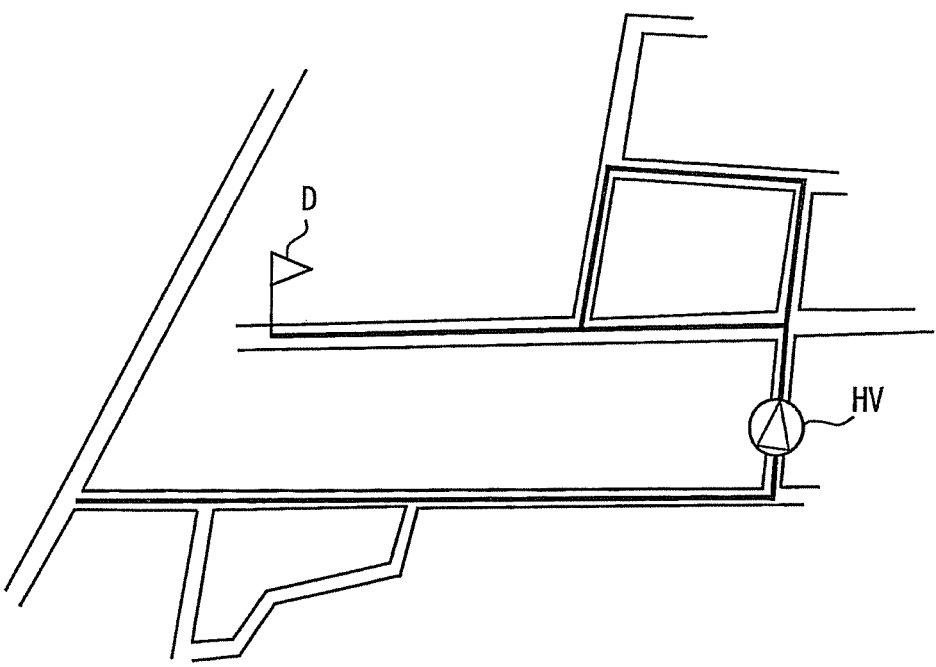

FIG. 7A illustrates an example to express the surplus portion, which is eliminated from the approach route, with the broken line. That is, the display portion 18 displays (i) the surplus portion that is already eliminated from the approach route and (ii) other portions excluding the surplus portion, two of which appear in the mutually different display formats. Further, FIGS. 7A and 7B illustrate the present position of the host vehicle as HV and the arrival position in the emergency site as D. The display format may be also differentiated by changing display colors.

Another configuration may be used for performing a display in a display portion 18 to distinguish between (i) the approach route with the surplus portion eliminated and (ii) the approach route with the surplus portion is not yet eliminated. For instance, the screen of the display portion 18 may be divided into two split screens, which display separately (i) the approach route with the surplus portion eliminated and (ii) the approach route with the surplus portion is not yet eliminated. Furthermore, a display switchover may be made by a manipulation of the manipulation switch group 20 to switch between (i) the approach route with the surplus portion eliminated and (ii) the approach route with the surplus portion is not yet eliminated.

Moreover, the route guidance may be performed by displaying only the approach route with the surplus portion eliminated out of (i) the approach route with the surplus portion eliminated and (ii) the approach route with the surplus portion is not yet eliminated. Moreover, the surplus portion elimination may not be executed regardless of whether a surplus portion is included in an approach route. For instance, the route guidance may be performed by displaying in the display portion 18 the approach route that has not yet undergone a surplus portion elimination, as indicated in FIG. 7B. The approach route which has not undergone a surplus portion elimination is an approach route that is received from the emergency vehicle A.

In addition, the display of the approach route may be omitted from the display portion 18. In this case, the route guidance may be performed by outputting the sound, which teaches the direction in which the host vehicle should proceed along the approach route, from the sound output portion 19. Furthermore, the route guidance may be performed by displaying the approach route in the display portion 18 as well as outputting the sound, which teaches the direction in which the host vehicle should proceed along the approach route, from the sound output portion 19. The route guidance of an approach route may be performed on the assumption to disregard the traffic regulations of one-way traffic or right/left turn prohibition, etc.

At S28, it is determined whether the emergency vehicle B arrives at the emergency site. For instance, when the present position of the emergency vehicle B comes to be located on the emergency position, it may be determined that the emergency vehicle B reaches the emergency position. When it is determined that the emergency vehicle B reaches the emergency position (S28: YES), the present process ends. In contrast, when it is not determined that the emergency vehicle B reaches the emergency position (S28: NO), the processing returns to S27 for repetition.

The above configuration according to the first embodiment is provided as follows. An approach route is prepared by using a route actually traveled by a first emergency vehicle having reached an emergency site earlier. The prepared approach route is then used for a route guidance by the navigation apparatus 1 of a second emergency vehicle which goes to the emergency site later than the first emergency vehicle. Thus the above configuration enables an occupant of the second emergency vehicle to receive a guidance of a route that can actually reach the emergency site. For example, several emergency vehicles gathering to an emergency site from over a wide area may include a nearby emergency vehicle near the emergency site (i.e., an occupant thereof), which is familiar with the corresponding area and arrives at the emergency site earlier. Such a case permits other emergency vehicles coming from distant areas to receive the route guidance using the approach route actually traveled by the nearby emergency vehicle a short time ago. This can provide an advantageous effect.

In addition, when a surplus portion which causes an approach route to pass through the same position again is contained in the approach route, the surplus portion is eliminated from the approach route before the route guidance is actually provided. Thus the above configuration enables an occupant of an emergency vehicle to receive a guidance of a route that can quickly reach an emergency site.

Furthermore, the approach route of an emergency vehicle which arrived at an emergency site previously can be used as an arrival-enabling route that is a route to enable actual arrival at or access to the emergency site. This configuration can provide the arrival-enabling route for a short time period as compared with a configuration that retrieves an arrival-enabling route by collecting a variety of information from a plurality of vehicles and/or a center. In addition, the transmission of an approach route is triggered by detecting a predetermined manipulation performed by an occupant of the emergency vehicle at the time of arriving at an emergency site. This may enable the transmission of the approach route for a significantly short time period after the vehicle arrives at the emergency site, with a high possibility. The above configuration thus permits a prompt guidance to reach an occurrence site of an emergency situation.

Furthermore, the transmission of the approach route may be completed for a significantly short time period after the emergency vehicle arrives at the emergency site, with a high possibility. Thus the transmitted approach route may be an approach route that is matching a recent state and thus passable actually. Thus the above configuration more enables an occupant of an emergency vehicle to receive a guidance of a route that can actually reach an emergency site certainly.

First Modification Example

In addition, the approach route guidance process by the control circuit 25b may be modified into a first modification example as follows. The above-mentioned emergency site specification information may be received from the emergency vehicle A in addition to the approach route; simultaneously, the received emergency site specification information may be not the same as the emergency site specification information of the host vehicle. In such a case, the subsequent processing may not be performed nor the received approach route may not be used. The emergency site identification information of a host vehicle may be information, which is inputted from the manipulation switch group 20 and acquired by the control circuit 25a. For instance, the emergency site identification information may be information, which is transmitted wirelessly from a center apparatus of an emergency vehicle and acquired by the control circuit 25a via the communicator 24. The control circuit 25a may function as a reception-side site acquisition section or means.

Figure 8:
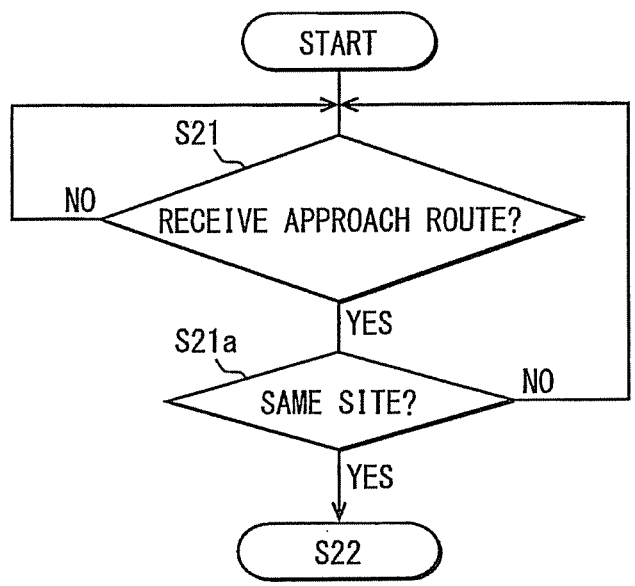
FIG. 8 is a flowchart diagram illustrating an approach route guidance process by a control circuit of a reception-side navigation apparatus according to a first modification example.

FIG. 8 will explain the approach route guidance process by the control circuit 25b according to the first modification example. FIG. 8 illustrates only a part of the flowchart of the approach route guidance process by the control circuit 25b according to the first modification example. That is, for the purpose of illustration, the flowchart in FIG. 8 omits a part identical to the part of FIG. 4 according to the first embodiment; the part corresponds to the processing subsequent to S22.

In addition, S21 is also identical to that of the approach route guidance process according to the first embodiment; thus, it is omitted. At S21a following S21, it is determined whether the emergency site specification information received from the emergency vehicle A is the same as the emergency site specification information of the host vehicle. When the determination is affirmed (S21a: YES), the processing proceeds to S22. In contrast, when the determination is negated (S21: NO), the processing returns to S21 for repetition.

The configuration of the first modification example helps prevent a reception failure that receives an approach route destined for an emergency site different from a proper emergency site.

Second Modification Example

Furthermore, the approach route guidance process by the control circuit 25b may be modified into a second modification example as follows. The above-mentioned vehicle size may be also received from the emergency vehicle A in addition to the approach route; simultaneously, the vehicle size of the host vehicle may be larger than the received vehicle size. In such a case, the guidance section may perform a route guidance while reporting the information which indicates that the host vehicle is greater than the vehicle from which the approach route is received. The vehicle size of the host vehicle is supposed to be stored in a nonvolatile memory in the control circuit 25b. Therefore, the control circuit 25b may function as a reception-side size storage section or means.

Figure 9:
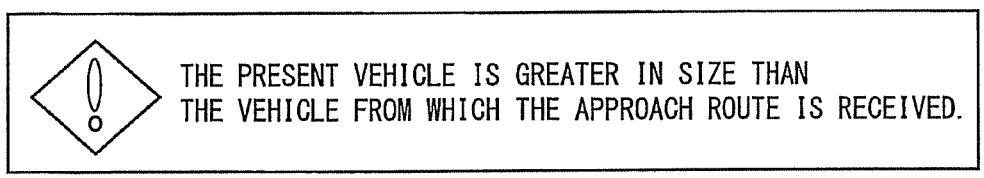
FIG. 9 is a diagram illustrating an example to indicate that a host vehicle is larger than a vehicle that transmits an approach route according to a second modification example.

For instance, the information indicating that a host vehicle is larger than a vehicle that transmitted an approach route may be provided as illustrated in FIG. 9. That is, the message "the present vehicle is greater in size than the vehicle from which the approach route is received" may be displayed in the display portion 18 in the route guidance along the approach route. Alternatively, the icon which indicates the emergency vehicle A of the transmission side of the approach route may be displayed to be smaller than the icon which indicates the host vehicle.

The second modification example reports to an occupant of the host vehicle the possibility to disable the host vehicle to pass through the received approach route. This may help the occupant select a different approach route in advance, thereby suppressing a time loss arising when the host vehicle is disabled to proceed further and is needed to return.

Second Embodiment

The present disclosure is not limited to the above-mentioned first embodiment; the following embodiment (i.e., a second embodiment) may be also contained in the technical scope of the present disclosure. The following explains a second embodiment with reference to FIG. 10. To simplify the explanation of the present embodiment, an element or component having the same function as that of the element or component explained in the first embodiment is assigned with the same reference number as that in the first embodiment and omitted from the following explanation. The navigation system 100 of the second embodiment is the same as the navigation system 100 of the first embodiment, except that a surplus portion of an approach route is eliminated by a transmission side instead of a reception side.

Figure 10:
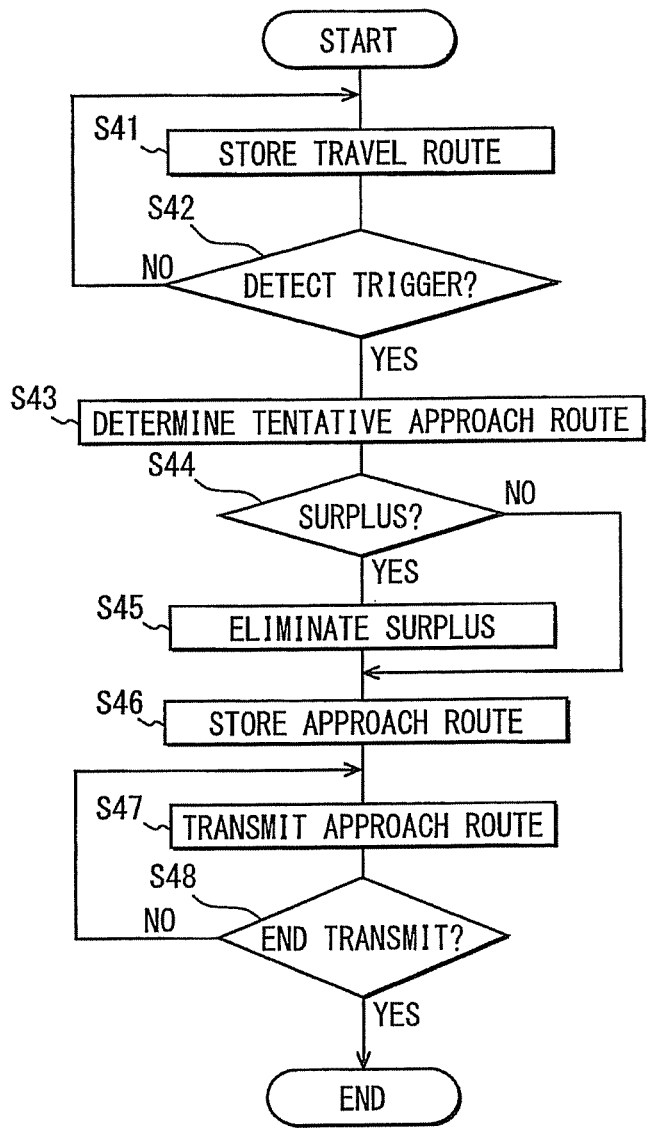
FIG. 10 is a flowchart diagram illustrating an approach route transmission process by a control circuit of a transmission-side navigation apparatus according to a second embodiment of the present disclosure.

The following explains an approach route transmission process by the control circuit 25*a* in the second embodiment with reference to a flowchart in FIG. 10. The present process may be also started when a manipulation is made to an exclusive use switch that is used to mobilize an emergency vehicle A to start to go to an emergency site.

S41 to S42 are the same as the above-mentioned S1 to S2; thus they are omitted from explanation.

At S43, a tentative approach route determination process is performed. The processing then proceeds to S44. The tentative approach route determination process is to record as a tentative approach route an approach route of the emergency vehicle A to reach the emergency site from a predetermined reference position in an electrically rewritable memory such as RAM based on a travel route of the emergency vehicle A stored in the memory of the control circuit 25*a*.

At S44, it is determined whether the tentative approach route includes a surplus portion that causes the approach route to pass through an identical position again. When the tentative approach route includes a surplus portion (S44: YES), the processing proceeds to S45. In contrast, when the tentative approach route includes no surplus portion (S44: NO), the processing proceeds to S46. The surplus portion is supposed to be the same as that explained in the first embodiment.

At S45, a surplus portion elimination process is performed which eliminates the surplus portion from the tentative approach route. The processing then proceeds to S46. The processing at S45 of the control circuit 25*a* may function as a transmission-side surplus elimination section or means. The surplus portion elimination process at S45 is supposed to be the same as that at S23 in the first embodiment.

At S46, an approach route record process is executed. The processing then proceeds to S47. The approach route record process at S46 records the tentative approach route in an electrically rewritable memory such as RAM. The processing at S46 may function as an approach route record section or means. The approach route stored in the memory is the approach route after the surplus portion is eliminated when the surplus elimination process is performed, or the approach route, which has not undergone the surplus elimination process, when the surplus elimination process is not performed.

S47 to S48 are the same as the above-mentioned S4 to S5; thus they are omitted from explanation. The processing at S47 may function as an approach route transmission section or means.

In addition, in the second embodiment, the approach route guidance process by the control circuit 25*b* that is a reception side of an approach route may be configured to be identical to the process in FIG. 4 excluding S22 and S23.

The second embodiment has the same configuration as that of the first embodiment, except that a surplus portion of an approach route is eliminated by a transmission side instead of a reception side. Thus, like the first embodiment, the second embodiment permits an occupant of an emergency vehicle to promptly receive a guidance of a route to certainly reach an occurrence site of an emergency situation.

Third Embodiment

The present disclosure is not limited to the above-mentioned first and second embodiments; the following embodiment (i.e., a third embodiment) may be also contained in the technical scope of the present disclosure. The following explains a third embodiment with reference to FIGS. 11 and 12. To simplify the explanation of the present modification, an element or component having the same function as that of the element or component explained in the foregoing embodiment is assigned with the same reference number as that in the foregoing embodiment and omitted from the following explanation.

The navigation system 100*a* of the third embodiment is different from the navigation system 100 of the first or second embodiment in respect of having a process in the case of receiving a plurality of approach routes from the navigation apparatuses 1 of a plurality of emergency vehicles.

Figure 11:
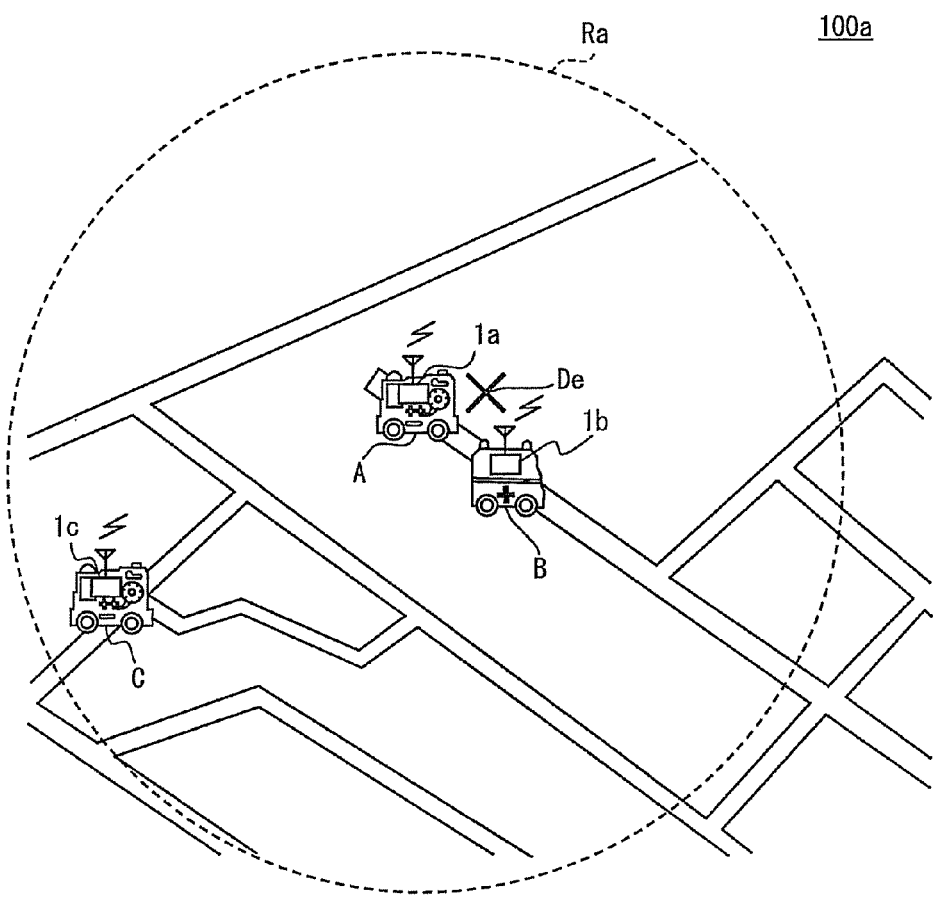
FIG. 11 is a diagram illustrating an overall configuration of a navigation system according to the second embodiment.

With reference to FIG. 11, the navigation system 100*a* includes navigation apparatuses 1*a*, 1*b*, and is mounted in respective emergency vehicles A, B, and C. The navigation system 100*a* may function as a route guidance system.

In FIG. 11, the emergency vehicles A and B are the same as those in the first and second embodiments. The emergency vehicle B, however, is supposed to have already arrived at the emergency site by using the approach route received from the emergency vehicle A. Therefore, the navigation apparatuses 1*a* and 1*b* of the emergency vehicles A and B function like the navigation apparatus 1*a* explained in the first and second embodiments. In addition, the emergency vehicle C is an emergency vehicle which has not yet arrived at the emergency site De. In FIG. 11, a circle Ra encircled with a broken line indicates a communication range of the vehicle-to-vehicle communication of the navigation apparatuses 1*a* and 1*b* of the emergency vehicles A and B.

The third embodiment has a configuration which includes three navigation apparatuses 1 in the navigation system 100*a*; however, there is no need to be limited thereto. The configuration of the navigation system 100*a* may include more than three navigation apparatuses 1 mounted in the respective emergency vehicles.

The following will explain an example configuration where the emergency vehicle B transmits an approach route in addition to the approach route from the emergency vehicle A in the first and second embodiments; herein, the emergency vehicle B has already arrived at the emergency site after using the approach route received from the emergency vehicle A.

The control circuits 25 of the navigation apparatuses 1*a* and 1*b* perform an approach route transmission process similar to that in the first and second embodiments. The third embodiment will explain an example configuration where an approach route is transmitted without performing a surplus portion elimination process like in the first embodiment, for the purpose of illustration. It is noted that since the emergency vehicle B has already arrived at the emergency site based on the approach route received from the emergency vehicle A, the approach route of the emergency vehicle B is an approach route which is prepared after the surplus portion elimination process to eliminate a surplus portion from the approach route of the emergency vehicle A. Therefore, the navigation apparatus 1*b* is supposed to transmit an approach route which does not include a surplus portion included in the approach route of the emergency vehicle A.

Figure 12:
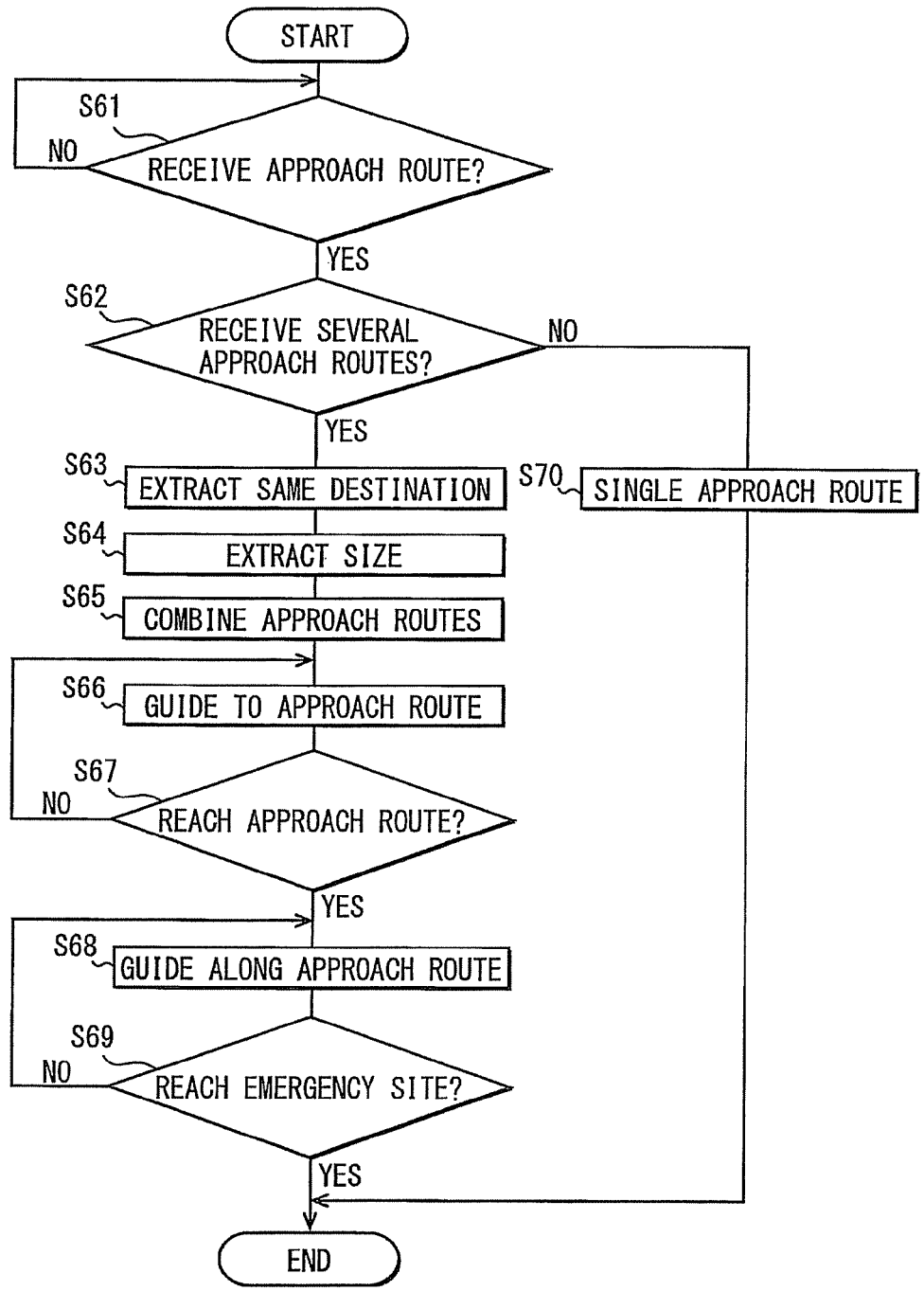
FIG. 12 is a flowchart diagram illustrating an approach route guidance process by a control circuit of a reception-side navigation apparatus according to a third embodiment of the present disclosure.

The following will explain an approach route transmission process by the control circuit 25c of the navigation apparatus is in the third embodiment with reference to a flowchart in FIG. 12. The control circuit 25c may function as a route guidance apparatus. The present process may be also started when a manipulation is made to an exclusive use switch that is used to mobilize an emergency vehicle A to start to go to an emergency site.

First, at S61, the control circuit 25c determines whether an approach route transmitted from the emergency vehicle A or the emergency vehicle B is received. When receiving it (S61: YES), the processing proceeds to S62. In contrast, when not receiving it (S61: NO), the processing returns to S61 for repetition. The control circuit 25c receives the approach route via the communicator 24. Therefore, the control circuit 25c may function as an approach route reception section or means.

At S62, it is determined whether to receive a plurality of approach routes, e.g., from both the emergency vehicle A and the emergency vehicle B. For instance, when a plurality of approach routes transmitted from the navigation apparatuses 1 of the different emergency vehicles are received within a predetermined time period, it is determined that a plurality of approach routes are received.

The above predetermined time period may be a time period that is longer than a transmission period of the approach route in the approach route transmission process. In addition, the determination as to whether to receive the approach routes transmitted from the navigation apparatuses 1 of the different emergency vehicles may be made based on the above-mentioned transmission IDs.

When it is determined that a plurality of approach routes are received (S62: YES), the processing proceeds to S63. In contrast, when it is not determined that a plurality of approach routes are received (S62: NO), the processing proceeds to S70.

At S63, an identical destination extraction process is performed. The processing then proceeds to S64. The identical destination extraction process is to extract an approach route, which is received along with the emergency site specification information that is the same as the emergency site specification information of the host vehicle. The emergency site specification information may be information, which is inputted from the manipulation switch group 20 and acquired by the control circuit 25c. Alternatively, for instance, the emergency site identification information may be information, which is transmitted wirelessly from a center apparatus of an emergency vehicle and acquired by the control circuit 25c via the communicator 24. Therefore, the control circuit 25c may also function as a reception-side site acquisition section or means.

When an approach route is received from the navigation apparatus 1 of an emergency vehicle destined for an emergency site different from that of the host vehicle, the received emergency site specification information naturally differs from that of the host vehicle. Thus the received approach route is eventually not extracted in the identical destination extraction process. This configuration helps prevent a reception failure that receives an approach route destined for an emergency site different from a proper emergency site.

At S64, a size extraction process is performed. The processing then proceeds to S65. The size extraction process is to extract an approach route, which is received along with a vehicle size that is not smaller than the vehicle size of the host vehicle. The processing at S64 may function as an approach route selection section or means. The vehicle size of the host vehicle is supposed to be stored in a nonvolatile memory in the control circuit 25c. Therefore, the control circuit 25c may also function as a reception-side size storage section or means.

When an approach route is received from the navigation apparatus 1 of an emergency vehicle having a vehicle size smaller than that of the host vehicle, the received approach route is not extracted in the size extraction process. The above configuration adopts an approach route that is received from an emergency vehicle not smaller than the vehicle size of the host vehicle in order to perform a route guidance, thus indicating an approach route having a width through which the host vehicle can actually pass.

At S65, an approach route combination process is executed. The processing then proceeds to S66. The approach route combination process is to combine some road segments included in a plurality of approach routes which are received to prepare a shortest approach route for the host vehicle to reach an emergency site. The processing at S65 may function as a combination section or means.

The shortest approach route prepared by combining the road segments included in a plurality of approach routes may be exemplified as follows. First, a closest link is extracted to have the shortest distance from the present position of the host vehicle among the links included in the plurality of received approach routes. To be specific, the closest link provides the smallest sum total of the lengths of the links intervening in between the closest link itself and the link in which the host vehicle is located. Then, the approach route is retrieved to be a combination of links that provide the smallest sum total of the lengths of the links in between the emergency site and the closest link.

Further, S66 to S69 are similar to above-mentioned S25 to S28. The processing at S66 or S68 may function as a guidance section or means. At S66, a recommended route is retrieved to travel from the present position of the host vehicle to the closest link serving as a destination. To be specific, the destination may be defined as the end node of the closest link.

At S70, a single approach route reception process is performed. Then the present process is ended. The single approach route reception process executes the same processing from S21 to S28 in the flowchart of FIG. 4.

The configuration according to the third embodiment receives a plurality of approach routes from a plurality of emergency vehicles, and combines the approach routes to prepare an approach route that guides the host vehicle to reach an emergency site with the shortest travel distance. Thus the above configuration enables an occupant of an emergency vehicle to receive a guidance of a route that can quickly reach an emergency site.

For example, the emergency vehicle C receives a first approach route from an emergency vehicle A and a second approach route from an emergency vehicle B. The first approach route and the second approach route without including a surplus portion that is included in the first approach route are combined to prepare an approach route that is similar to but more efficient than the second approach route.

Third Modification Example

The third embodiment combines some road segments included in a plurality of received approach routes to prepare the shortest approach route for the host vehicle to reach an emergency site. There is no need to be limited to the above. A third modification example is to select an approach route, which is shortest to an emergency site for the host vehicle, from a plurality of received approach routes.

Figure 13:
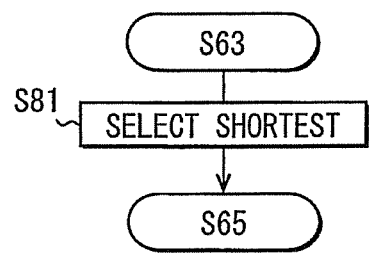
FIG. 13 is a flowchart diagram illustrating an approach route guidance process by a control circuit of a reception-side navigation apparatus according to a third modification example.

The following explains an approach route guidance process by the control circuit 25c in the third modification example with reference to a flowchart of FIG. 13. For the purpose of illustration, the flowchart in FIG. 13 omits a part identical to the part of FIG. 12 according to the third embodiment; the omitted part corresponds to the processing before S63 and after S65.

At S81 following S65, a shortest approach route selection process is performed. The processing then proceeds to S65. The shortest approach route selection process is to select an approach route, which is shortest to an emergency site for the host vehicle, from a plurality of received approach routes. The processing at S83 function as a shortest approach route selection section or means. Selecting an approach route shortest to an emergency site for the host vehicle among a plurality of approach routes may be exemplified as follows. That is, an approach route which has the shortest sum total of the link lengths is selected among the approach routes.

The configuration of the third modification example receives a plurality of approach routes from a plurality of emergency vehicle, selects an approach route that is shortest for the host vehicle to an emergency, and performs a route guidance along the selected approach route. Thus the above configuration enables an occupant of an emergency vehicle to receive a guidance of a route that can quickly reach an emergency site.

For example, the emergency vehicle C receives a first approach route from an emergency vehicle A and a second approach route from an emergency vehicle B. The first approach route and the second approach route without including a surplus portion that is included in the first approach route are considered for selection; thus, the more efficient second approach route from the emergency vehicle B is selected.

In addition, in the third modification example, the approach route selected at S81 may include a surplus portion which passes through the same position again. In such a case, the surplus portion may be eliminated like the processing at S23.

The first to third embodiments use the travel route and the approach route that are represented by link data and node data. There is no need to be limited to the above. For example, a travel locus is indicated as a group of the present positions continuously detected by the position detection unit 11. Such a travel locus may be used as a travel route or an approach route. In this case, a route guidance may be performed by displaying an approach route in the display portion 18 as a locus representing the collection of the vehicle positions without displaying an electronic map, or by outputting an audio guidance of right/left turn from the sound output portion 19.

In addition, a start position of an approach route may be defined as a position where the host vehicle enters a region not having link data, i.e., a position that separates from a road. In this case, the approach route may be displayed in the display portion 18 using a locus representing the collection of vehicle positions of the emergency vehicle continuously detected by the position detection unit 11. Such configuration enables a route guidance to an emergency site that exists in a region not having link data.

The first to third embodiments use a vehicle-to-vehicle communication to transmit directly an approach route from a navigation apparatus 1 of a transmission-side vehicle to a navigation apparatus 1 of a reception-side vehicle. However, there is no need to be limited thereto. The approach route may be indirectly transmitted from a navigation apparatus 1 of a transmission-side vehicle to a navigation apparatus 1 of a reception-side vehicle via a roadside apparatus, a center, and/or the like.

In addition, the first to third embodiments explain a transmission-side vehicle of an approach route as an emergency vehicle. There is no need to be limited to the above. For instance, a transmission-side vehicle of an approach route may be a vehicle other than an emergency vehicle. However, a transmission-side vehicle of an approach route may be desirable to be an emergency vehicle. This is because the emergency vehicle may be permitted to disregard some traffic regulations such as on-way traffic or left/right turn prohibition, eventually transmitting an approach route permitting a prompt arrival to an emergency site.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A route guidance system executed on a processor, the system comprising:
    a travel route transmission apparatus used in at least one subject vehicle, the apparatus including
        an approach route record section configured to record an approach route of the subject vehicle from a predetermined reference position to an emergency site which is an occurrence position of an emergency situation, and
        an approach route transmission section configured to start a transmission of the approach route recorded in the approach route record section upon detecting a predetermined manipulation by an occupant of the subject vehicle when the subject vehicle arrives at the emergency site; and
    a route guidance apparatus used in an emergency vehicle, the apparatus including
        an approach route reception section configured to receive the approach route transmitted from the travel route transmission apparatus of the subject vehicle, and
        a guidance section configured to perform a route guidance to the emergency site based on the approach route received by the approach route reception section,
    wherein:
    the subject vehicle configured to use the travel route transmission apparatus is an emergency vehicle;
    the travel route transmission apparatus further includes a transmission-side site acquisition section configured to acquire first site identification information which specifies a first emergency site where the emergency vehicle configured to use the travel route transmission apparatus is expected to approach;
    the approach route transmission section further transmits the first site identification information acquired by the transmission-side site acquisition section when transmitting the approach route;
    the approach route reception section of the route guidance apparatus receives the first site identification information plus the approach route transmitted from the travel route transmission apparatus;

the route guidance apparatus further includes a reception-side site acquisition section configured to acquire second site identification information which specifies a second emergency site where the emergency vehicle configured to use the route guidance apparatus is expected to approach; and the guidance section performs the route guidance based on the approach route, which is transmitted from the travel route transmission apparatus configured to transmit the first site identification information that is identical to the second site identification information acquired by the reception-side site acquisition section.

2. The route guidance system according to claim 1, wherein:

the route guidance apparatus further includes a reception-side surplus elimination section configured to eliminate a surplus portion from the approach route received by the approach route reception section to prepare a surplus-eliminated approach route when the surplus portion is included in the approach route, the surplus portion causing the approach route to pass through an identical position again; and the guidance section performs the route guidance along the surplus-eliminated approach route when the reception-side surplus elimination section eliminates the surplus portion.

3. The route guidance system according to claim 2, wherein:

the guidance section performs the route guidance by performing a display in a display portion to distinguish between (i) the surplus-eliminated approach route and (ii) the approach route before the surplus portion is eliminated.

4. The route guidance system according to claim 1, wherein:

the travel route transmission apparatus further includes a transmission-side surplus elimination section configured to eliminate a surplus portion from the approach route recorded by the approach route record section to prepare a surplus-eliminated approach route when the surplus portion is included in the approach route, the surplus portion causing the approach route to pass through an identical position again;

the approach route transmission section transmits the surplus-eliminated approach route upon detecting the predetermined manipulation by the occupant of the subject vehicle when the subject vehicle arrives at the emergency site in cases that the transmission-side surplus elimination portion eliminates the surplus portion; and the guidance section of the route guidance apparatus performs the route guidance along the surplus-eliminated approach route received by the approach route reception section.

5. The route guidance system according to claim 1, wherein:

the travel route transmission apparatus further includes a transmission-side size storage section configured to store a size of the subject vehicle configured to use the travel route transmission apparatus;

the approach route transmission section further transmits the size of the subject vehicle stored in the transmission-side size storage section when transmitting the approach route;

the approach route reception section of the route guidance apparatus receives the size of the subject vehicle plus the approach route transmitted from the travel route transmission apparatus;

the route guidance apparatus further includes a reception-side size storage section configured to store a size of the emergency vehicle configured to use the route guidance apparatus;

the system further comprises: a plurality of the travel route transmission apparatuses that are used in a plurality of the respective subject vehicles; and the route guidance apparatus further includes an approach route selection section configured to select a target approach route based on the size of the emergency vehicle and the sizes of the plurality of the subject vehicles received by the approach route reception section when the approach routes are received from the plurality of the travel route transmission apparatuses of the plurality of the subject vehicles, the target approach route being the approach route transmitted by the travel route transmission apparatus that is used in the subject vehicle whose size is not smaller than the size of the emergency vehicle configured to use the route guidance apparatus.

6. The route guidance system according to claim 1, wherein:

the travel route transmission apparatus includes a transmission-side size storage section configured to store a size of the subject vehicle configured to use the travel route transmission apparatus;

the approach route transmission section transmits the size of the subject vehicle stored in the transmission-side size storage section when transmitting the approach route;

the approach route reception section of the route guidance apparatus receives the size of the subject vehicle plus the approach route transmitted from the travel route transmission apparatus;

the route guidance apparatus includes a reception-side size storage section configured to store a size of the emergency vehicle configured to use the route guidance apparatus; and in cases that the size of the emergency vehicle is greater than the size of the subject vehicle received by the approach route reception section, the guidance section reports information which indicates that the emergency vehicle is greater than the subject vehicle of which the travel route transmission apparatus transmits the approach route when performing the route guidance based on the approach route received by the approach route reception section.

7. The route guidance system according to claim 1, further comprising:

a plurality of the travel route transmission apparatuses that are used in a plurality of the respective subject vehicles, wherein:

the route guidance apparatus further includes a combination section configured to prepare a shortest approach route by selectively combining road segments of the plurality of approach routes received by the approach route reception section from the plurality of the travel route transmission apparatuses, the shortest approach route being a shortest route from the emergency vehicle to the emergency site; and the guidance section performs the route guidance along the shortest approach route prepared by the combination section when the plurality of approach routes are received by the approach route reception section.

8. The route guidance system according to claim 1, further comprising:

a plurality of the travel route transmission apparatuses that are used in a plurality of the respective subject vehicles, wherein:
the route guidance apparatus includes a shortest route selection section configured to select a shortest approach route from the plurality of approach routes received by the approach route reception section from the plurality of the travel route transmission apparatuses, the shortest approach route being a shortest route from the emergency vehicle to the emergency site; and
the guidance section performs the route guidance based on the shortest approach route prepared by the shortest route selection section when the plurality of approach routes are received by the approach route reception section.

9. The route guidance system according to claim 1, wherein:
the approach route transmission section of the travel route transmission apparatus transmits the approach route to the approach route reception section of the route guidance apparatus via a vehicle-to-vehicle communication configured to permit a direct communication between the subject vehicle using the travel route transmission apparatus and the emergency vehicle using the route guidance apparatus.

10. The route guidance system according to claim 1, wherein:
the approach route recorded by the approach route record section is an actually-traveled approach route that has been actually traveled by the subject vehicle from the predetermined reference position to the emergency site which is the occurrence position of the emergency situation; and
the route guidance of the emergency vehicle to the emergency site is performed by the guidance section based on the actually-traveled approach route that has been actually traveled by the subject vehicle from the predetermined reference position to the emergency site and received by the approach route reception section.

11. The route guidance system according to claim 1, wherein:
the travel route transmission apparatus includes a transmission-side size storage section configured to store a size of the subject vehicle configured to use the travel route transmission apparatus;
the approach route transmission section transmits the size of the subject vehicle stored in the transmission-side size storage section when transmitting the approach route;
the approach route reception section of the route guidance apparatus receives the size of the subject vehicle plus the approach route transmitted from the travel route transmission apparatus;
the route guidance apparatus includes a reception-side size storage section configured to store a size of the emergency vehicle configured to use the route guidance apparatus;
the route guidance apparatus preforms a size determination as to whether the size of the emergency vehicle is greater than the size of the subject vehicle received by the approach route reception section; and
the guidance section of the route guidance apparatus performs the route guidance of the emergency vehicle to the emergency site based on a result from the size determination in addition to the approach route received by the approach route reception section.

12. The route guidance system according to claim 1, wherein:
the route guidance apparatus further includes a position acquisition section configured to acquire continuously a present position of the emergency vehicle configured to use the route guidance apparatus, and
a retrieval section configured to retrieve a retrieval route from the present position acquired by the retrieval section to a joining position where the retrieval route joins with the approach route,
wherein:
the guidance section of the route guidance apparatus performs the route guidance along the route retrieved by the retrieval section until the emergency vehicle reaches the joining position, whereas the guidance section performs the route guidance along the approach route after the emergency vehicle reaches the joining position.

13. A route guidance system executed on a processor, the system comprising:
a travel route transmission apparatus used in at least one subject vehicle, the apparatus including
an approach route record section configured to record an approach route of the subject vehicle from a predetermined reference position to an emergency site which is an occurrence position of an emergency situation, and
an approach route transmission section configured to start a transmission of the approach route recorded in the approach route record section upon detecting a predetermined manipulation by an occupant of the subject vehicle when the subject vehicle arrives at the emergency site; and
a route guidance apparatus used in an emergency vehicle, the apparatus including
an approach route reception section configured to receive the approach route transmitted from the travel route transmission apparatus of the subject vehicle, and
a guidance section configured to perform a route guidance to the emergency site based on the approach route received by the approach route reception section,
wherein:
the travel route transmission apparatus includes a transmission-side size storage section configured to store a size of the subject vehicle configured to use the travel route transmission apparatus;
the approach route transmission section transmits the size of the subject vehicle stored in the transmission-side size storage section when transmitting the approach route;
the approach route reception section of the route guidance apparatus receives the size of the subject vehicle plus the approach route transmitted from the travel route transmission apparatus;
the route guidance apparatus includes a reception-side size storage section configured to store a size of the emergency vehicle configured to use the route guidance apparatus;
the route guidance apparatus preforms a size determination as to whether the size of the emergency vehicle is greater than the size of the subject vehicle received by the approach route reception section; and
the guidance section of the route guidance apparatus performs the route guidance of the emergency vehicle to the emergency site based on a result from the size determination in addition to the approach route received by the approach route reception section.

14. The route guidance system according to claim 13, wherein:
the route guidance apparatus further includes a position acquisition section configured to acquire continuously a present position of the emergency vehicle configured to use the route guidance apparatus, a retrieval section configured to retrieve a retrieval route from the present position acquired by the retrieval section to a joining position where the retrieval route joins with the approach route; and the guidance section performs the route guidance along the route retrieved by the retrieval section until the emergency vehicle reaches the joining position, whereas the guidance section performs the route guidance along the approach route after the emergency vehicle reaches the joining position.

15. The route guidance system according to claim 13, wherein:

the approach route recorded by the approach route record section is an actually-traveled approach route that has been actually traveled by the subject vehicle from the predetermined reference position to the emergency site which is the occurrence position of the emergency situation; and the route guidance of the emergency vehicle to the emergency site is performed by the guidance section based on the actually-traveled approach route that has been actually traveled by the subject vehicle from the predetermined reference position to the emergency site and received by the approach route reception section.

16. A route guidance apparatus executed on a processor and cooperating with a travel route transmission apparatus, the route guidance apparatus being used in an emergency vehicle and the travel route transmission apparatus being used in at least one subject vehicle, the route guidance apparatus and the travel route transmission apparatus being included in a route guidance system, the travel route transmission apparatus including:

an approach route record section configured to record an approach route of the subject vehicle from a predetermined reference position to an emergency site which is an occurrence position of an emergency situation; and an approach route transmission section configured to start a transmission of the approach route recorded in the approach route record section upon detecting a predetermined manipulation by an occupant of the subject vehicle when the subject vehicle arrives at the emergency site, the route guidance apparatus comprising:

an apparatus route reception section configured to receive the approach route transmitted from the travel route transmission apparatus of the subject vehicle; and a guidance section configured to perform a route guidance to the emergency site based on the approach route received by the approach route reception section, wherein:

the subject vehicle configured to use the travel route transmission apparatus is an emergency vehicle;

the travel route transmission apparatus further includes a transmission-side site acquisition section configured to acquire first site identification information which specifies a first emergency site where the emergency vehicle is configured to use the travel route transmission apparatus is expected to approach;

the approach route transmission section of the travel route transmission apparatus further transmits the first site identification information acquired by the transmission-side site acquisition section when transmitting the approach route;

the approach route reception section of the route guidance apparatus receives the first site identification information plus the approach route transmitted from the travel route transmission apparatus;

the route guidance apparatus further includes a reception-side site acquisition section configured to acquire second site identification information which specifies a second emergency site where the emergency vehicle configured to use the route guidance apparatus is expected to approach; and the guidance section of the route guidance apparatus performs the route guidance based on the approach route, which is transmitted from the travel route transmission apparatus configured to transmit the first site identification information that is identical to the second site identification information acquired by the reception-side site acquisition section.

17. The route guidance apparatus according to claim 16, further comprising:

a position acquisition section configured to acquire continuously a present position of the emergency vehicle configured to use the route guidance apparatus; and a retrieval section configured to retrieve a retrieval route from the present position acquired by the retrieval section to a joining position where the retrieval route joins with the approach route, wherein:

the guidance section performs the route guidance along the route retrieved by the retrieval section until the emergency vehicle reaches the joining position, whereas the guidance section performs the route guidance along the approach route after the emergency vehicle reaches the joining position.

18. A travel route transmission apparatus executed on a processor and cooperating with a route guidance apparatus, the route guidance apparatus being used in an emergency vehicle and the travel route transmission apparatus being used in at least one subject vehicle, the route guidance apparatus and the travel route transmission apparatus being included in a route guidance system, the travel route transmission apparatus comprising:

an approach route record section configured to record an approach route of the subject vehicle from a predetermined reference position to an emergency site which is an occurrence position of an emergency situation; and an approach route transmission section configured to start a transmission of the approach route recorded in the approach route record section upon detecting a predetermined manipulation by an occupant of the subject vehicle when the subject vehicle arrives at the emergency site, the route guidance apparatus including:

an approach route reception section configured to receive the approach route transmitted from the travel route transmission apparatus of the subject vehicle; and a guidance section configured to perform a route guidance to the emergency site based on the approach route received by the approach route reception section, wherein:

the subject vehicle configured to use the travel route transmission apparatus is an emergency vehicle, the travel route transmission apparatus further comprising:
- a transmission-side site acquisition section configured to acquire first site identification information which specifies a first emergency site where the emergency vehicle configured to use the travel route transmission apparatus is expected to approach, wherein:

the approach route transmission section further transmits the first site identification information acquired by the transmission-side site acquisition section when transmitting the approach route;

the approach route reception section of the route guidance apparatus receives the first site identification information plus the approach route transmitted from the travel route transmission apparatus;

the route guidance apparatus further includes a reception-side site acquisition section configured to acquire second site identification information which specifies a second emergency site where the emergency vehicle configured to use the route guidance apparatus is expected to approach; and the guidance section performs the route guidance based on the approach route, which is transmitted from the travel route transmission apparatus configured to transmit the first site identification information that is identical to the second site identification information acquired by the reception-side site acquisition section.

19. The travel route transmission apparatus according to claim 18, wherein:

the route guidance apparatus further includes
- a position acquisition section configured to acquire continuously a present position of the emergency vehicle configured to use the route guidance apparatus, and
- a retrieval section configured to retrieve a retrieval route from the present position acquired by the retrieval section to a joining position where the retrieval route joins with the approach route, wherein:

the guidance section of the route guidance apparatus performs the route guidance along the route retrieved by the retrieval section until the emergency vehicle reaches the joining position, whereas the guidance section performs the route guidance along the approach route after the emergency vehicle reaches the joining position.

\* \* \* \* \*